United States Patent
Young et al.

(10) Patent No.: US 6,241,038 B1
(45) Date of Patent: Jun. 5, 2001

(54) REMOTE DROP BOX LUBRICATION CIRCUIT FOR TRACTORS

(75) Inventors: David A. Young; Vladimir M. Kowalyk, both of Winnipeg (CA)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/432,242

(22) Filed: Nov. 2, 1999

Related U.S. Application Data

(60) Provisional application No. 60/107,153, filed on Nov. 5, 1998.

(51) Int. Cl.[7] .................................................. F16N 25/00
(52) U.S. Cl. .......................... 180/53.8; 180/339; 74/467
(58) Field of Search .................................. 180/305, 306, 180/307, 53.1, 53.4, 53.6, 53.62, 53.8, 339; 417/405, 406; 60/453; 74/411.5, 467

(56) References Cited

U.S. PATENT DOCUMENTS

| | | | |
|---|---|---|---|
| 3,478,621 | * | 11/1969 | Johnson et al. .................... 180/306 |
| 3,945,208 | * | 3/1976 | O'Connor ............................ 60/453 |
| 4,191,270 | * | 3/1980 | Monteith ........................... 180/53.4 |
| 4,577,524 | * | 3/1986 | Richards et al. ................. 74/411.5 |
| 5,682,958 | * | 11/1997 | Kalhorn et al. .................... 180/307 |
| 5,878,724 | * | 3/1999 | Channing ........................... 417/406 |

FOREIGN PATENT DOCUMENTS

874398 * 10/1981 (SU) ...................................... 180/307

* cited by examiner

Primary Examiner—Frank Vanaman
(74) Attorney, Agent, or Firm—Larry W. Miller; John William Stader

(57) ABSTRACT

A remote drop box can be provided for tractor hydraulic drives; however, a system for providing lubrication to and cooling of the remote drop box is necessary. Maximum drawbar pull and maximum road speed capability are both desirable when a variable hydrostatic motor defines the working range. The hydrostatic motor must be operated very close to its maximum rated operating speed during roading, which leaves very little margin for overspeeding that occurs when the tractor is roading downhill. An improved overspeed control is also desirable. A problem encountered when a hydrostatic drive is used with a high torque engine in that, as the engine speed drops, the available charge pump flow also drops and eventually reaches a point where the required servo pressure to maintain the hydraulic pump in stroke cannot be maintained. Such a condition needs to be alleviated to provide an effectively operating hydrostatic drive system. Load sensing hydrostatic drive systems can encounter vibrational or surging problems, particularly when flow compensators in valving interact with the flow compensator of the hydraulic pump. This interaction will cause rhythmic flow pulsations or surging within the hydraulic system, which is undesirable. Stabilizing the hydraulic system can be accomplished with an attenuator/hose assembly.

2 Claims, 8 Drawing Sheets

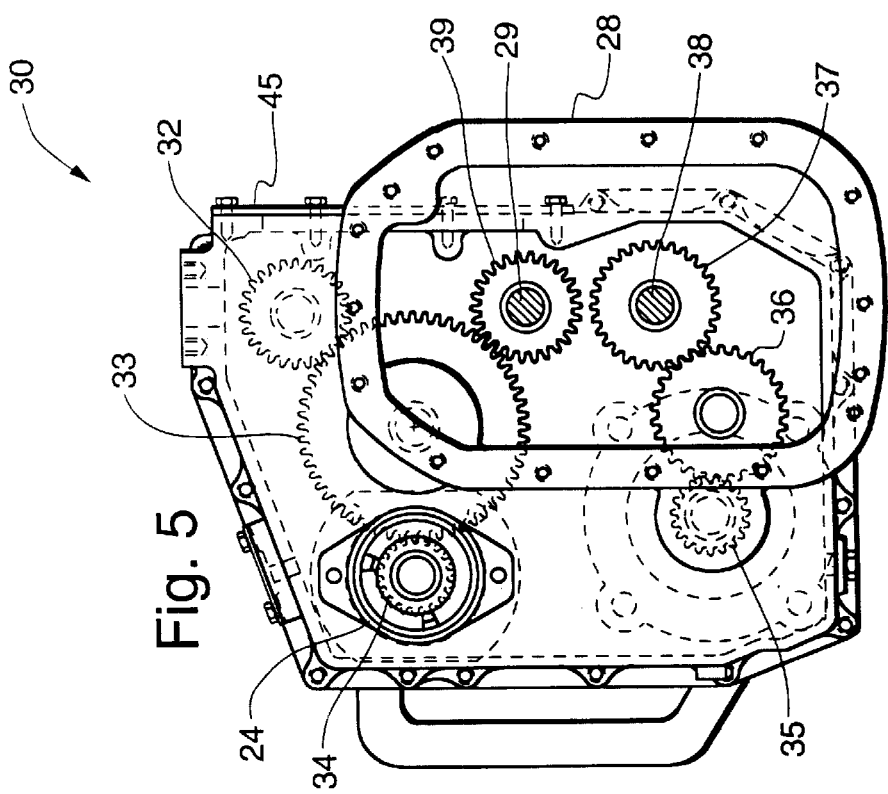
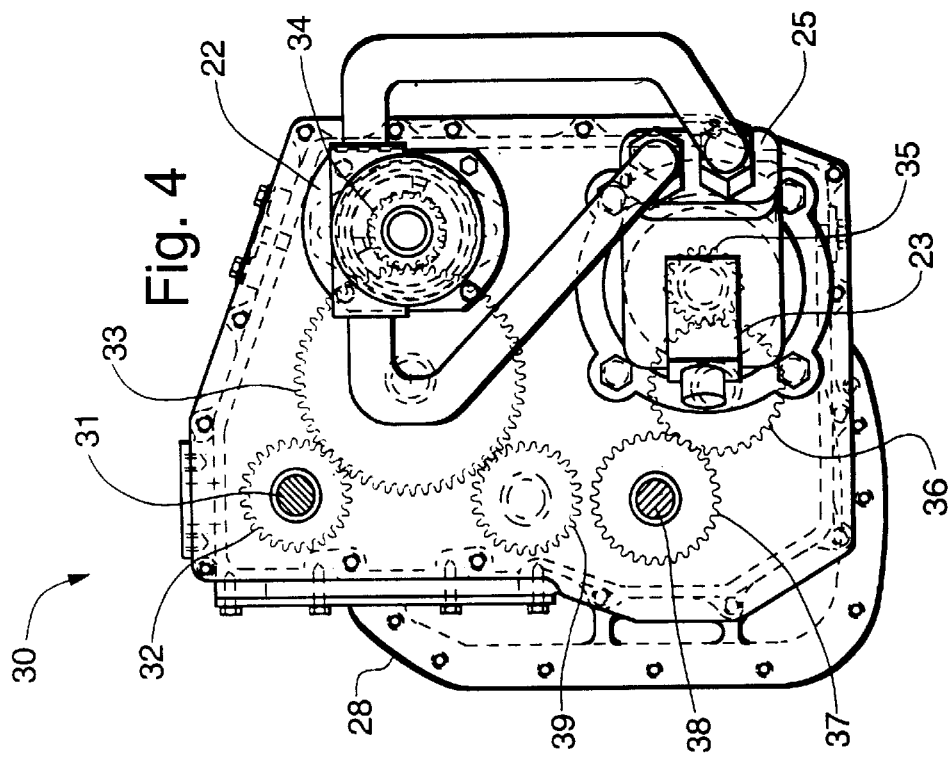

REMOTE DROP BOX LUBRICATION CIRCUIT FOR TRACTORS

CROSS-REFERENCE TO RELATED APPLICATIONS

This application claims domestic priority on U.S. Provisional Patent Application Ser. No. 60/107,153, filed Nov. 5, 1998.

BACKGROUND OF THE INVENTION

This invention relates generally to four wheel drive articulated tractors and, more particularly, to improvements to the drive system for hydrostatically driven tractors.

It is desirable to integrate all the drives for the input driven components of an articulated four wheel drive tractor into a single gearbox affixed to the rear axle housing of the tractor. Such a mechanism would place the hydrostatic pump for powering the traction drive of the tractor, the hydraulic pump for the tractor hydraulic system, the drive for the power-takeoff (PTO) system, and any auxiliary hydraulic pumps to be driven off the same gearbox device with the output driver components, including the hydrostatic motor, speed reduction gears and output drive shafts.

Lubrication of a gear set is a consideration in the design of a gearbox device for transferring rotational power through gear sets arranged and configured to provide the proper rotational speed to a component driven from the engine of the tractor. Commonizing lubrication sumps can minimize the number of lubrication systems that need to be provided as well as provide more effective lubrication of the gear sets and tile cooling of the lubrication fluid.

Conventional tractor drive mechanisms include a mechanical transmission to provide different output speeds for a given engine input speed. Even hydraulically driven tractors have utilized a three speed mechanical transmission between the hydrostatic motor and the final drive to provide desired different output speeds to the operation of the final drive for powering the movement of the tractor. It would be desirable to replace the three speed mechanical transmission on hydrostatically driven tractors to minimize cost and to enhance operation of the tractor.

Obtaining maximum drawbar pull and maximum road speed capability in a hydrostatically driven tractor requires the variable hydrostatic motor be operated at close to it's maximum rated operating speed when in road gear. Since there is little margin then remaining for overspeeding under conditions where the tractor is moving downhill, some overspeed control must be provided.

When the hydrostatic drive is used with a high torque rise engine, the available charge pump flow drops as the engine speed drops until the point of not being able to maintain servo pressure is reached, resulting in a hydrostatic stall. Under these conditions, the engine will continue to run, while the hydraulic fluid is being sent over relief creating heat.

SUMMARY OF THE INVENTION

It is an object of this invention to provide a hydrostatically driven tractor utilizing a variable hydrostatic motor to provide operative power to the drive wheels of the tractor.

It is a feature of this invention that an electronic control of the hydrostatic drive mechanism is provided.

It is another feature of this invention that the overspeed control for the hydrostatic motor is provided electronically.

It is an advantage of this invention that the displacement of the hydrostatic motor is automatically increased to reduce output speed whenever the tractor overspeeds by traveling downhill.

It is another advantage of this invention that the displacement of the hydrostatic motor is automatically corrected in response to a comparison of the detected output speed of the motor with the desired output speed.

It is another object of this invention to provide an overspeed control for a hydrostatically driven tractor.

It is still another object of this invention to provide remote cooling of the hydraulic fluid used for lubricating a remote drop box for a tractor power-takeoff.

It is still another feature of this invention that the oil is taken for a remote drop box from the oil cooler outlet into a hydraulic motor/pump combination.

It is still another advantage of this invention that the pump displacement for the remote drop box is slightly larger than the motor so that the remote drop box will not overfill.

It is still another object of this invention to provide a supplemental charge pressure and flow to prevent hydrostatic stall conditions.

It is yet another feature of this invention that a supplemental charge flow is provided with a circuit that includes a reducing valve to provide adequate charge pressure and flow to the hydrostatic pump to maintain servo pressure even when engine speed drops off.

It is yet another advantage of this invention that the hydrostatic stall condition can be avoided when engine speed drops from encountering a high draft load.

It is yet another object of this invention to provide a hydrostatically driven, four wheel drive tractor which is durable in construction, inexpensive of manufacture, carefree of maintenance, facile in assemblage, and simple and effective in use.

These and other objects, features and advantages can be found in the instant invention in which a system is provided for lubricating and cooling a remote drop box for a hydrostatically drive four wheel drive tractor. The hydrostatic motor is operated very close to its maximum rated operating speed during roading in order to maximize drawbar pull and road speed capability for a variable hydrostatic motor, leaving very little margin for overspeeding that occurs when the tractor is roading downhill. An electronic overspeed control is provided to provide dynamic engine braking. When the hydrostatic drive is used with a high torque engine, the available charge pump flow drops as the engine speed drops, and eventually reaches a point where the required servo pressure to maintain the hydraulic pump in stroke cannot be maintained. Such a condition is alleviated by the supplemental charge flow system. Stabilization of the hydraulic load sensing system, which is subject to rhythmic flow pulsations or surging, particularly when flow compensators in valving interact with the flow compensator of the hydraulic pump, is accomplished with an attenuator/hose assembly.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is a front elevational view of the splitter gearbox and associated drives corresponding to lines 4—4 of FIG. 3;

FIG. 5 is a rear elevational view of the splitter gearbox corresponding to lines 5—5 of FIG. 3;

DETAILED DESCRIPTION OF THE PREFERRED EMBODIMENT

Figure 1:
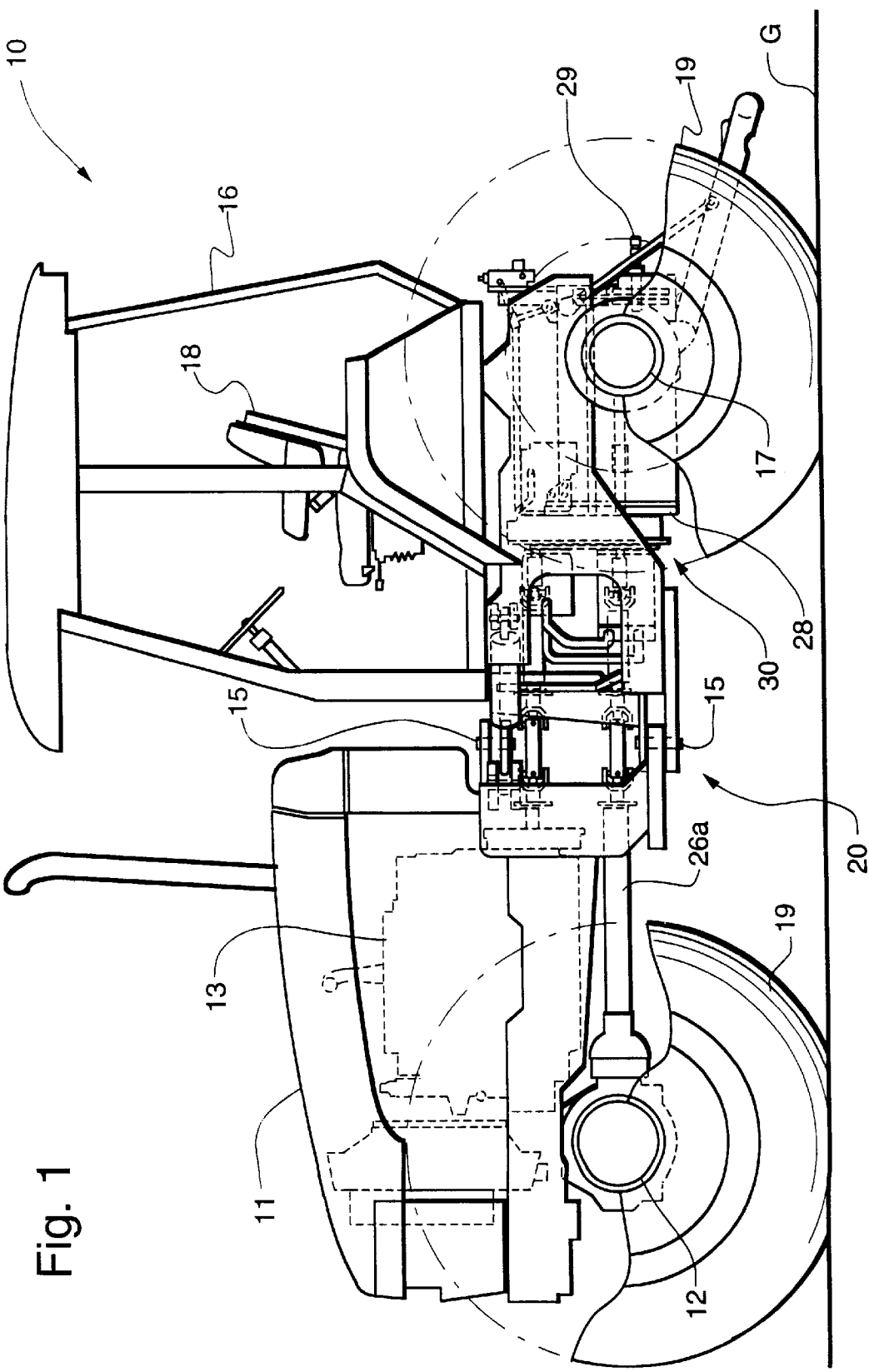
FIG. 1 is a side elevational view of a four wheel drive, articulated tractor incorporating the principles of the instant invention, portions of the tractor being broken away for purposes of clarity.

Referring now to FIG. 1, a four wheel drive, articulated tractor incorporating the principles of the instant invention can best be seen. The articulated tractor 10 includes a forward engine end 11 supported above the ground G by a front axle assembly 12 and carrying an engine 13. The rearward cab end 16 of the tractor 10 is supported above the ground by a rear axle assembly 17 and has an operator's station 18 mounted thereon. Each of the front and rear axle assemblies 12, 17 is provided with a pair of opposing wheels 19 for mobile movement of the tractor 10 over the surface of the ground G. The front and rear ends 11, 16 of the tractor 10 are connected by an articulation joint 15, the manipulation of which effects steering of the tractor 10 in a known manner.

As best seen in FIGS. 1–7, the tractor 10 is provided with a drive system 20 that is operatively connected to the engine 13 to provide operative power for the front and rear axle assemblies 12, 17. The drive system 20 includes a splitter gearbox 30 mounted on the front of the rear axle assembly 17 in a manner to share the oil sump therewith for lubrication purposes. The drive system 20 also includes the input drive components, including a hydrostatic pump 22 for powering the traction drive of the tractor 10, a hydraulic pump 24 for pressuring the hydraulic system of the tractor 10, and a power takeoff (PTO) mechanism 29; and the output drive components, including a variable displacement hydrostatic motor 25 to provide operative power to both the front and rear axle assemblies 12, 17 through front and rear output drive shafts 26, 27.

Figure 6:
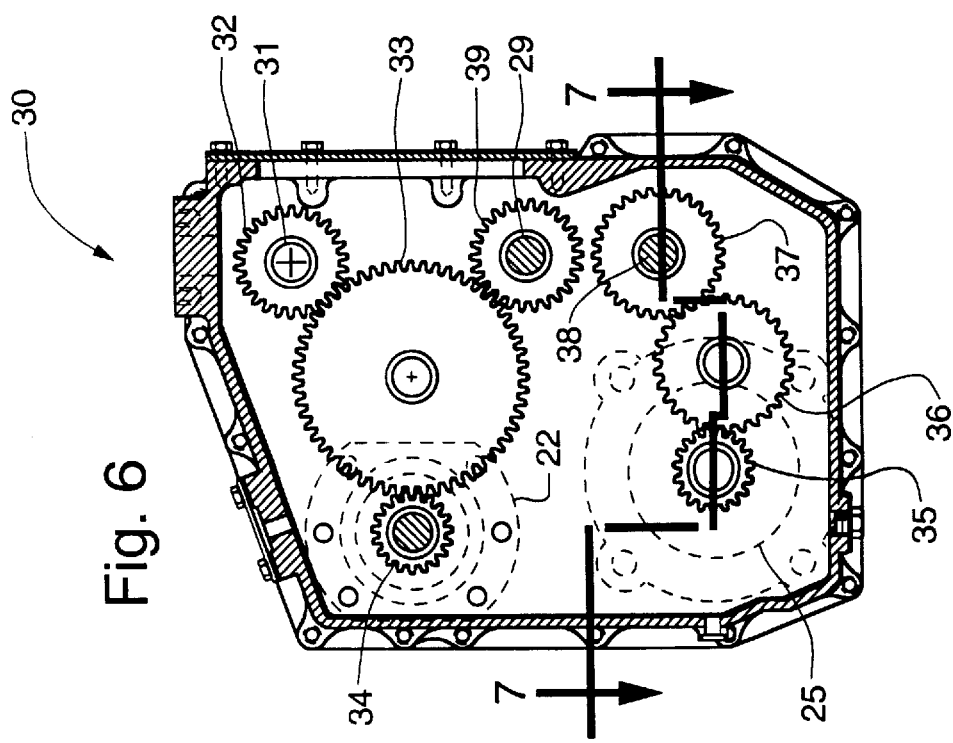
FIG. 6 is a cross-sectional view through the splitter gearbox taken along lines 6—6 of FIG. 3.

The splitter gearbox 30 receives rotational power from the engine 13 via a power input shaft 31 interconnecting the engine 13 and the splitter gearbox 30 to rotate the input gear 32. As best seen in FIGS. 4–6, the input gear 32 is drivingly engaged with a first idler drive gear 33, the size of the respective gears 32, 33 being selected to provide the appropriately desired gear reduction. The first idler drive gear 33 is drivingly engaged with a pump drive gear 34 having both the hydrostatic pump 22 and the hydraulic pump 24 coaxially mounted therewith, the hydrostatic pump 22 being mounted on the front of the splitter gearbox 30 and the hydraulic pump 24 being mounted on the rear of the splitter gearbox 30. The idler drive gear 33 is also drivingly engaged with the PTO drive gear 39 for powering the PTO mechanism 29 as a direct drive input from the engine 13.

As best seen in FIGS. 3–7, the hydrostatic pump 22 is operable to circulate hydraulic fluid under pressure to a variable displacement hydraulic motor 25 mounted on the front of the splitter gearbox 30 below the hydrostatic pump 22 to drive rotation of the hydraulic motor 25. The drive pinion 35 of the hydrostatic motor 25 is drivingly engaged with a second idler gear 36, which is also appropriately sized to provide the desired gear reduction. The second idler gear 36 is drivingly engaged with a traction driven gear 37 having a single shaft 38 extending therethrough to project both forwardly and rearwardly from the splitter gearbox 30 and form the front and rear output drive shafts 26, 27.

The hydrostatic motor 25 is preferably set-up with three pre-set, fixed swash plate angles to provide three positive displacements for the motor 25 to proximate a conventional operation of the tractor 10. By utilizing the variable displacement of the hydrostatic motor 25 and/or a variable speed hydrostatic pump 22, the infinite speed adjustment for the tractor 10 can still be attained on-the-go. Using an electronic control system to control the operation of the motor 25, such as by modulating the displacement of the motor 25, and to control the operation of the pump 22, a very smoothly operating power-shift tractor 10 will result without requiring the operator to stop the tractor to change gears in a mechanical transmission, as is conventional. The fixed, pre-set displacements for the hydrostatic motor 25 provide maximum torque and minimum speed at a first position, a mid-range of both torque and speed at a second position, and a minimum torque with maximum speed for roading operations at a third position.

Figure 2:
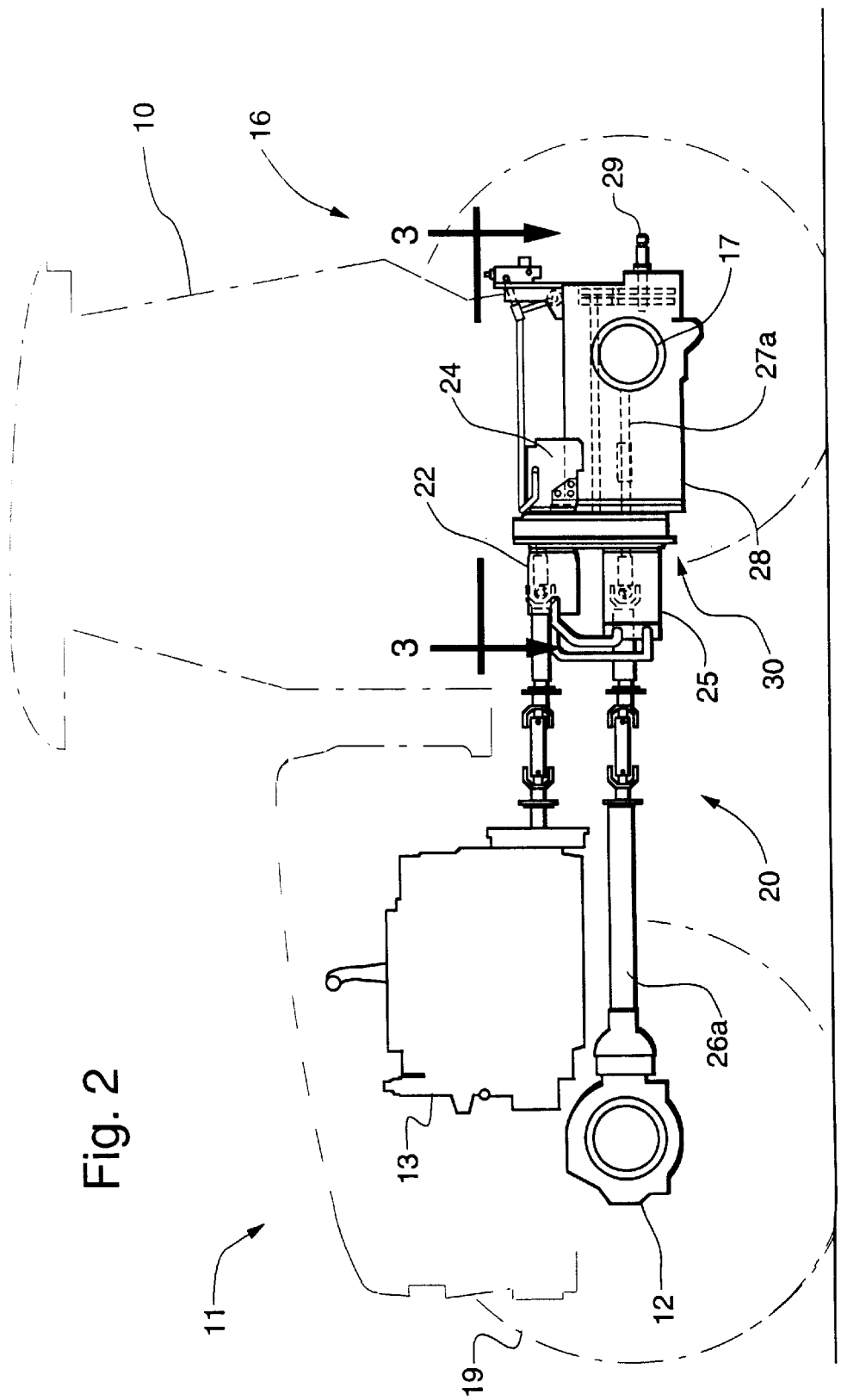
FIG. 2 is a schematic side elevational view of the drive mechanism having a splitter gearbox and associated drives incorporating the principles of the instant invention.

As best seen in FIGS. 1 and 2, the front axle assembly 12 is drivingly connected to the front output drive shaft 26 by a front drive shaft assembly 26a. The rear axle assembly 17 is drivingly connected to the rear output drive shaft 27 by a rear drive shaft assembly 27a passing internally through the housing 28 of the rear axle assembly 17. Likewise, the PTO mechanism 29 is drivingly connected to the PTO drive gear 39 and passes through the housing 28 of the rear axle assembly 17 and projects rearwardly therefrom for remote connection to an apparatus (not shown) for delivering rotational power thereto.

Accordingly, the top portion of the splitter gearbox 30 receives rotational power directly from the engine 13 and drives the input drive train components, including the hydrostatic pump 22, the hydraulic pump 24 and the PTO mechanism 29. The lower portion of the splitter gearbox 30 receives operative power from the hydrostatic motor 25 operatively driven from the hydrostatic pump 22 and delivers the rotational power through the output shafts 26, 27 to drive the front and rear axle assemblies 12, 17 from a single hydrostatic motor 25 off of a single gear drive set 35–37.

Figure 11:
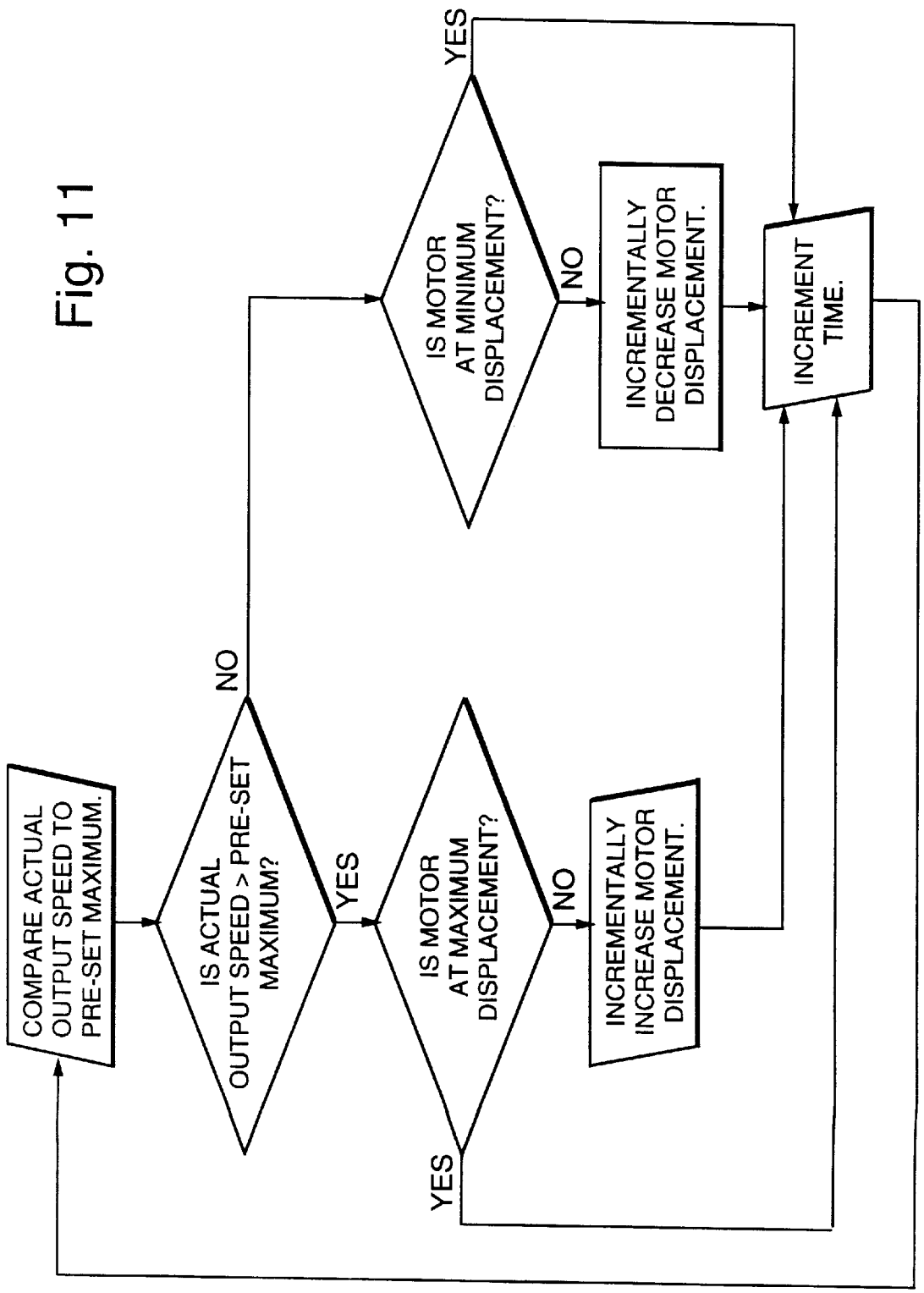
FIG. 11 is a flow diagram demonstrating the electronic overspeed control of the tractor.

In order to achieve both maximum drawbar pull and maximum road speed capability from the hydrostatic transmission, in which the variable hydrostatic motor 25 defines the working range of the tractor, the hydrostatic motor 25 must be operated very close to the maximum rated operating speed where the tractor is in road gear. This operational characteristic leaves very little room for overspeeding which can occur when the tractor is being roaded downhill. As a result, the output speed of the hydrostatic motor 25 is preferably controlled electronically. As demonstrated in FIG. 11, the actual motor output speed is compared with a pre-set maximum motor speed. If the actual motor output speed is greater than the pre-set limit, the motor displacement will be increased electronically, thus slowing the tractor and maintaining a safe operating speed for the hydrostatic motor 25.

Accordingly, the electronic control 23 of the displacement of the motor 25 provides a dynamic braking. As the tractor reaches level ground, the control circuit would decrease the displacement of the hydrostatic motor 25 due to the actual motor speed becoming significantly less than the pre-set limit. This electronic control 23 would continue to de-stroke the motor 25 displacement until the maximum pre-set speed limit was reached or the motor 25 was at minimum displacement.

Figure 3:
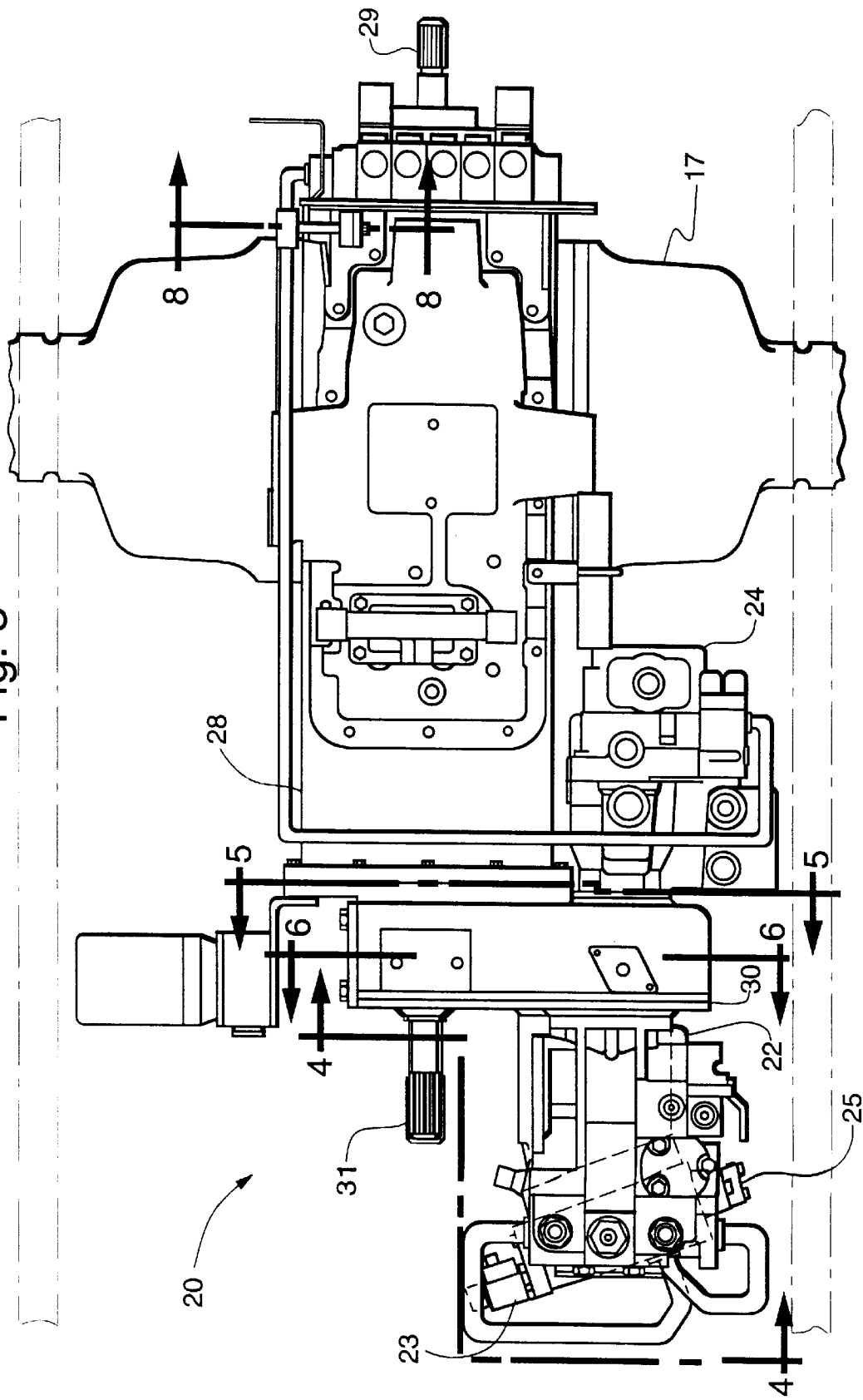
FIG. 3 is a top plan view of the splitter gearbox and rear axle housing corresponding to lines 3—3 of FIG. 2.
Figure 7:
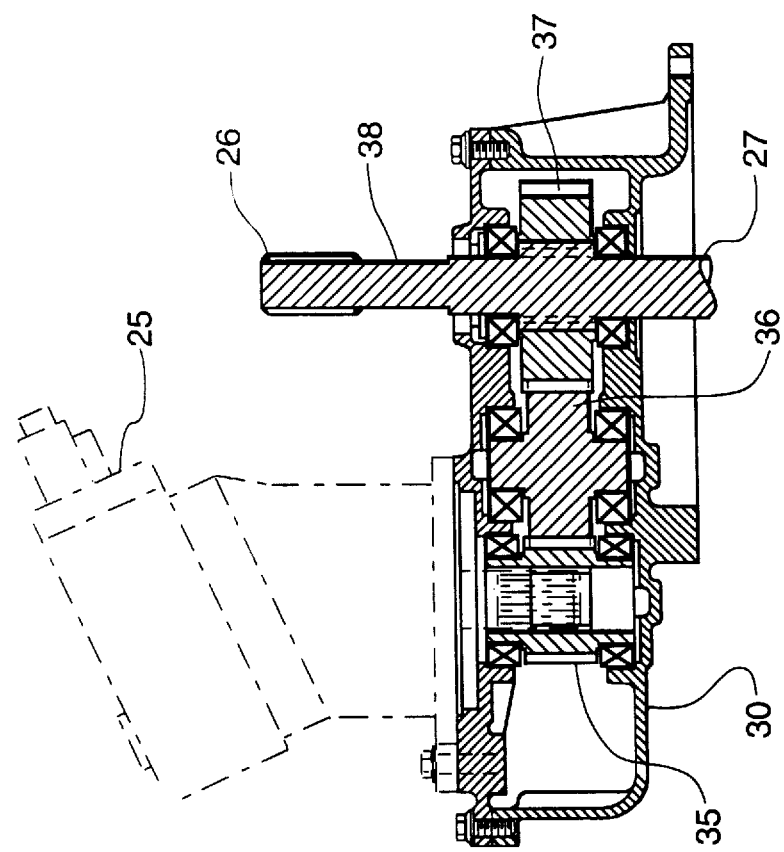
FIG. 7 is a cross-sectional view of the splitter gearbox taken along lines 7—7 of FIG. 6 to depict the gear drive system for driving the front and rear axles from a single hydrostatic motor shown in phantom.
Figure 8:
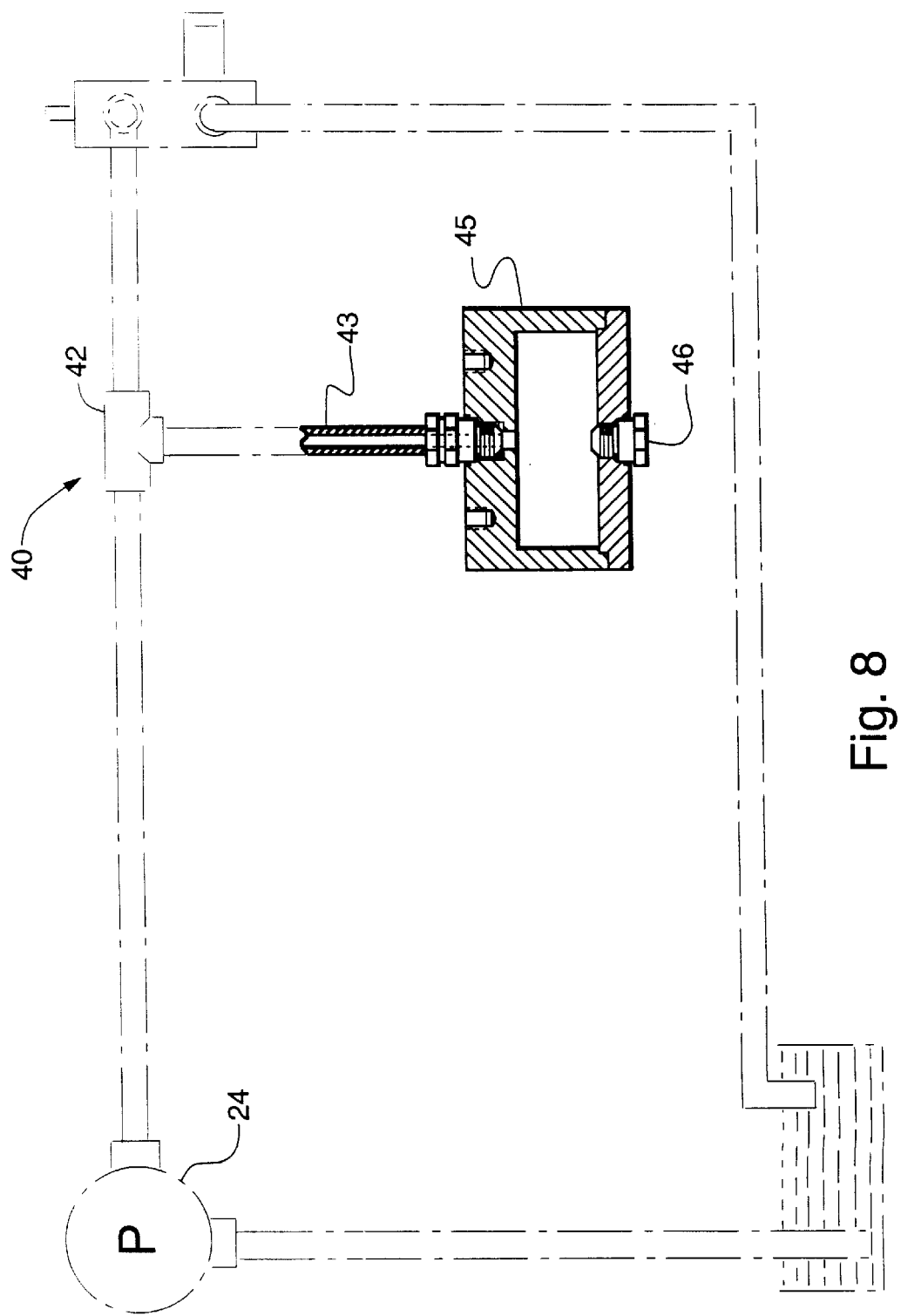
FIG. 8 is a partial cross-sectional view of the hydraulic system corresponding to lines 8—8 of FIG. 3 to depict the hydraulic attenuator mechanism, a representative associated hydraulic system being schematically shown in phantom.

Referring now to FIGS. 3 and 8, the hydraulic attenuation mechanism 40 can best be seen. The attenuator/hose assembly 40 consists of a "T" 42 plumbed into the hydraulic circuit in parallel with the load sense line to open the circuit to the attenuator chamber 45, including a pre-defined length of tubing 43 terminating in a fixed displacement chamber 45. The chamber 45 is provided with a removable drain plug 46 to permit access to the circuit and to the chamber 45 for bleeding air from the chamber 45 and the load sense line. By properly selecting the length of the tubing 43 and the size of the chamber 45, the hydraulic system can be tuned to avoid vibrational and surging problems. The attenuator/hose assembly 40 is designed to resonate at the frequency causing the hydraulic system to surge. Such a use of an attenuator/hose assembly 40 will draw the problem frequency into the attenuator, thus leaving the hydraulic system in a stable condition. Such an attenuator/hose assembly 40 will not slow the system response as would the placement of orifices within the load sensing line.

Figure 9:
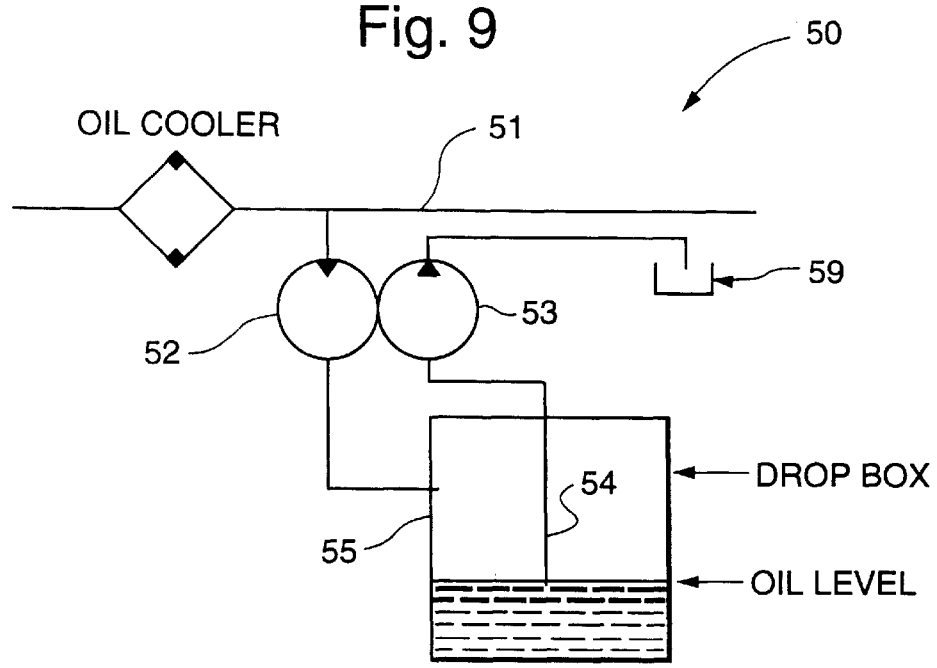
FIG. 9 is a schematic diagram of a remote drop box hydraulic lubrication and cooling circuit.

Referring now to the schematic diagram of FIG. 9, the hydraulic circuit 50 for lubricating and cooling a remote drop box 55 for a power-takeoff mechanism, located at the front end of the tractor, can be seen. The lubrication oil is taken from the oil cooler outlet line 51 and diverted directly into a hydraulic motor 52 having a hydraulic pump 53 combined therewith to be driven by a common shaft (not shown). The displacement of the pump 53 is selected to be slightly larger than the displacement of the hydraulic motor 52 so that the drop box 55 will not overflow. The pump 53 draws lubrication oil from the drop box 55 through a stand pipe 54 that is positioned to maintain a constant supply of lubrication oil in the drop box 55. While operating continuously, the pump 53 discharges to the system return 59 and can accept a non-continuous supply of oil from the drop box 55. The motor/pump combination 52, 53 maintains a constant oil level in the drop box 55 and provides a flow for lubrication and cooling operations.

The circuit 50 is designed to allow a portion of the flow from the oil cooler line 51 to be diverted into the drop box 55. Oil passes through the motor 52 to drive the pump 53 and then flows into the lubrication galleries of the gear set (not shown) within the PTO drop box 55. The pressure drop across the motor 52 and the lubrication galleries control the flow rate of oil through the circuit 50. In practice, there is a flow rate of about 30 gallons per minute discharged from the oil cooler through line 51; however, only about 2 gallons per minute is diverted through the circuit 50.

Figure 10:
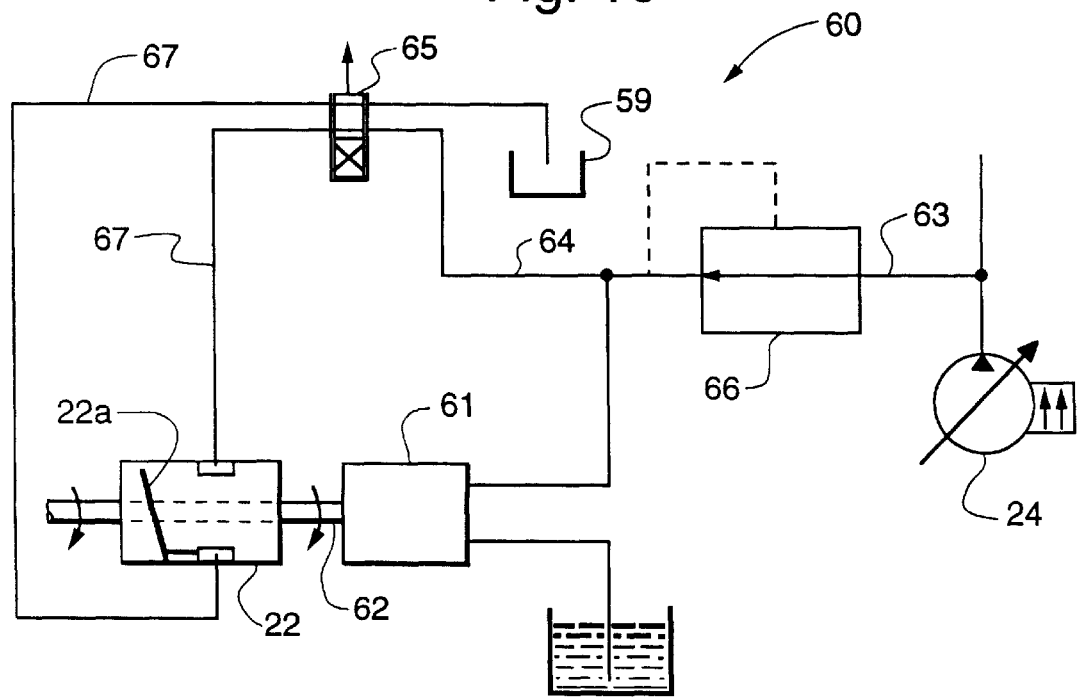
FIG. 10 is a schematic diagram of a hydraulic charge pressure and flow supplement circuit.

Referring now to the schematic diagram of FIG. 10, the hydraulic circuit 60 for supplementing the hydraulic charge pressure and flow for controlling the operation of the hydrostatic pump 22. A requirement of an agricultural vehicle drive train is to either stall the engine or spin the wheels when a high draft load is encountered. When a hydrostatic drive system is utilized for the tractor in conjunction with a high torque rise engine, the available charge pump flow drops with the engine speed and can reach a point where the required servo pressure to maintain the hydrostatic pump in stroke cannot be maintained. This condition can be alleviated by supplementing the hydrostatic charge system with flow from the implement circuit pump.

The charge pump 61 is driven by the shaft 62 driving the hydrostatic pump 22 to provide hydraulic pressure and flow to operate the servos in the hydrostatic pump controlling the angle of the swash plate 22a. If the engine speed slows, the rotational speed of the drive shaft 62 slows and the servo pressure and flow from the charge pump 61 drop accordingly. A drop in the servo pressure results in the swash plate 22a reducing to a shallower angle, thereby thrusting the hydrostatic pump 22 into a smaller displacement. As a result, there is a reduced load on the engine 13 preventing it from stalling and a reduced output from the hydrostatic pump 22 that will not cause the wheels to spin.

The supplemental flow circuit 60 includes a line 63 to divert hydraulic fluid from the implement circuit supplied by the hydraulic pump 24 into the line 64 directing hydraulic charge fluid to a mechanically operated valve 65 controlling the direction of flow through lines 67 to hydrostatic pump servos. A reducing valve 66 in the line 63 is set to a pressure below the nominal hydrostatic charge relief pressure. In normal operation, when there is sufficient charge flow in line 64, the reducing valve 66 closes, thus disabling the supplemental charge circuit 60 and preventing hydraulic fluid from flowing from line 64 into line 63. As the engine speed drops and the resultant hydrostatic charge pressure in line 64 drops below the setting of the reducing valve 66, the reducing valve 66 opens to allow flow of fluid from the implement circuit pump 24 through line 63 to supplement the hydrostatic charge circuit 60 and, thereby, keep the servos of the hydrostatic pump 22 in stroke. The reducing valve 66 also limits the pressure into the hydrostatic charge circuit 60 as the implement circuit can operate between 250–3000 psi. An additional benefit of the supplementing charge flow circuit 60 is that a smaller hydrostatic charge pump 61 can be used, resulting in lower parasitic losses.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A tractor comprising:

an engine mounted on a wheeled frame to provide operative power;

a power transmission mechanism operatively associated with said engine to transfer operational power from said engine to different parts of said tractor, said power transmission mechanism including a drop box including a gear set requiring lubrication;

a hydraulic circuit having a source of lubrication fluid under pressure, said hydraulic circuit including an oil cooler and an outlet line therefrom carrying lubrication fluid under pressure; and a hydraulic lube circuit providing lubrication fluid to said gear set in said drop box, said hydraulic lube circuit including:
- a first line connected to said oil cooler outlet line to draw only a portion of the lubrication fluid flowing therethrough and direct said lubrication fluid into said drop box;
- a hydraulic motor in communication with said first line to be driven by the lubrication fluid drawn through said first line before reaching said drop box;
- a hydraulic pump driven by said hydraulic motor to pump said lubrication fluid from said drop box, said hydraulic motor and said hydraulic pump mounted on a common shaft, said hydraulic pump having a larger displacement than said hydraulic motor so that said hydraulic pump draws more lubrication fluid from said drop box than said hydraulic motor will pass into said drop box; and
- means including a stand pipe connected to said hydraulic pump to maintain a constant supply of lubrication fluid within said drop box.

2. In a tractor having an engine mounted on a wheeled frame to provide operative power; a power transmission mechanism operatively associated with said engine to transfer operational power from said engine to different parts of said tractor, said power transmission mechanism including a drop box including a gear set requiring lubrication; a hydraulic circuit having hydraulic lube circuit providing lubrication fluid to said gear set in said drop box, the improvement comprising:

- a first line connected to said oil cooler outlet line to draw only a portion of the lubrication fluid flowing therethrough and direct said lubrication fluid into said drop box;
- a hydraulic motor in communication with said first line to be driven by the lubrication fluid drawn through said first line before reaching said drop box;
- a hydraulic pump driven by said hydraulic motor to pump said lubrication fluid from said drop box, said hydraulic motor and said hydraulic pump mounted on a common shaft and said hydraulic pump having a larger displacement than said hydraulic motor so that said hydraulic pump draws more lubrication fluid from said drop box than said hydraulic motor will pass into said drop box; and
- means including a stand pipe connected to said hydraulic pump to maintain a constant supply of lubrication fluid within said drop box.

* * * * *